(12) United States Patent
Pietrasz et al.

(10) Patent No.: US 9,666,876 B2
(45) Date of Patent: May 30, 2017

(54) OXYGEN REDUCTION REACTION CATALYST HAVING A NON-CONDUCTIVE SUBSTRATE

(71) Applicant: Ford Global Technologies, LLC, Dearborn, MI (US)

(72) Inventors: Patrick Pietrasz, Vancouver (CA); Kerrie Gath, Pittsfield, MI (US); Chunchuan Xu, Troy, MI (US); Jun Yang, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 14/340,695

(22) Filed: Jul. 25, 2014

(65) Prior Publication Data
US 2016/0028093 A1    Jan. 28, 2016

(51) Int. Cl.
*H01M 4/88*    (2006.01)
*H01M 4/92*    (2006.01)
*H01M 8/1018*  (2016.01)
*B82Y 30/00*   (2011.01)

(52) U.S. Cl.
CPC ............ *H01M 4/925* (2013.01); *B82Y 30/00* (2013.01); *H01M 2008/1095* (2013.01); *Y02E 60/50* (2013.01); *Y02E 60/521* (2013.01); *Y02P 70/56* (2015.11); *Y02T 90/32* (2013.01)

(58) Field of Classification Search
CPC ...................................................... H01M 4/88
See application file for complete search history.

(56) References Cited

U.S. PATENT DOCUMENTS

| 6,403,245 | B1 | 6/2002 | Hunt |
| 6,911,411 | B2 | 6/2005 | Cox et al. |
| 7,067,453 | B1 | 6/2006 | Ming et al. |
| 2007/0122686 | A1 | 5/2007 | Alexandrovichserov et al. |

FOREIGN PATENT DOCUMENTS

| CA | 2 593 413 A1 | 12/2008 |
| WO | 2013/122548 A1 | 8/2013 |

OTHER PUBLICATIONS

Chen, Yin-Zu et al., "Yttria-stablized zirconia supported platinum catalysts (Pt/YSZs) for CH4/CO2 reforming," Applied Catalysis A: General, v. 217, Issues 1-2, 2001, pp. 23-31 (English Abstract Only).

(Continued)

*Primary Examiner* — Jacob Marks
(74) *Attorney, Agent, or Firm* — Damian Porcari; Brooks Kushman P.C.

(57) ABSTRACT

An oxygen reduction reaction catalyst (ORR) and a method for making the catalyst are provided. The method may include depositing (e.g., by PVD) conductive catalyst material onto a non-conductive substrate, such as particles or powder, to form an intermediate ORR catalyst. The intermediate ORR catalyst may then be heat treated and another deposition process may be performed to form a thin, electrically interconnected catalyst network layer overlying the non-conductive substrate. The catalyst material may include, for example, platinum, gold, or other platinum group or noble metals, or alloys thereof. The non-conductive substrate may be a ceramic, for example, yttria-stabilized zirconia (YSZ).

14 Claims, 3 Drawing Sheets

(56) References Cited

OTHER PUBLICATIONS

Co, A. et al., "Oxygen reactions at platinum/Yttria-Stabilized Zirconia Interfaces," Proc. on Solid Oxide Fuel Cells, The Electrochemical Society Inc., Fall Meeting 2001, pp. 141-151 (English Abstract Only).

Hertz, J.L. et al., "Nanocomposite Platinum-Yttria Stabilized Zirconia Electrode and Implications for Micro-SOFC Operation," J. Electrochem. Soc. 2007, v. 154, Issue 4, pp. B413-B418 (English Abstract Only).

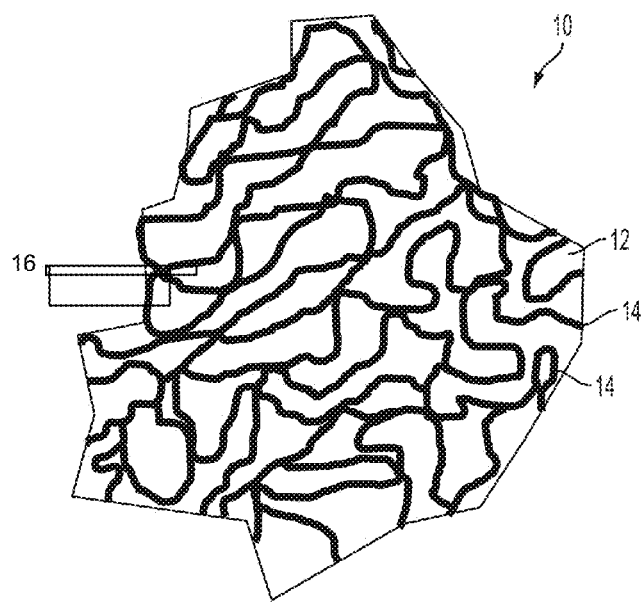
FIG. 1
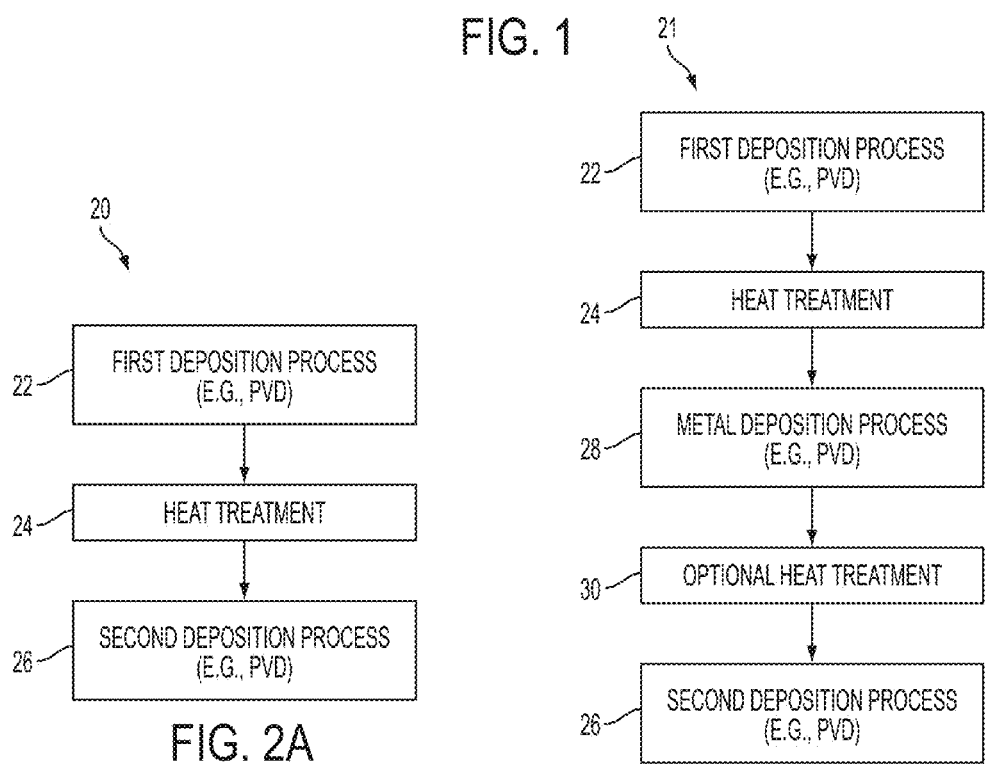
FIG. 2A
FIG. 2B

OXYGEN REDUCTION REACTION CATALYST HAVING A NON-CONDUCTIVE SUBSTRATE

TECHNICAL FIELD

The present disclosure relates to oxygen reduction reaction catalysts having non-conductive substrates, for example, ceramic powders or particles.

BACKGROUND

A durable, highly active oxygen reduction reaction (ORR) catalyst is an important candidate in developing proton exchange membrane fuel cell (PEMFC) powered vehicles. For many years, it has been known that carbon-supported platinum (Pt) based particles can be used as an ORR catalyst. However, Pt-based ORR catalysts often have issues with durability, due to the wide range of operating voltages that may be experienced in a single cell. These voltage ranges may stress both the Pt catalyst and/or the carbon substrate. Ways to improve the durability of the ORR catalyst and to enhance the reaction activity have been the focus of widespread research.

SUMMARY

In at least one embodiment, an oxygen reduction reaction catalyst (ORR) is provided comprising a particle substrate and an electrically interconnected catalyst network layer overlying the particle substrate. The catalyst network layer may have a thickness of 1 to 20 atomic layers and include a platinum group element.

The particle substrate may be a non-conductive particle substrate, such as yttria-stabilized zirconia (YSZ). The catalyst network layer may have a thickness of 0.5 to 20 nm. The catalyst network layer may include pure platinum or a platinum alloy, such as a platinum-gold alloy including at least 80 wt % platinum. The ORR catalyst may have a specific activity of at least 1.5 mA/cm$^2$ Pt. In one embodiment, the electrically interconnected catalyst network layer has a plurality of openings formed therein. The electrically interconnected catalyst network layer may have a percolated structure.

In at least one embodiment, a method of forming an oxygen reduction reaction (ORR) catalyst is provided. The method may include a first deposition step including depositing a conductive catalyst material onto a non-conductive particle substrate to form an intermediate ORR catalyst. A heat treatment step may be performed, including heat treating the intermediate ORR catalyst. A second deposition step may be performed, including depositing the conductive catalyst material onto the intermediate ORR catalyst to form an electrically interconnected catalyst network layer overlying the non-conductive particle substrate.

The first deposition step may be performed in a reducing environment and second deposition step may be performed in an inert environment. The first and second deposition steps may include sputtering. The heat treating step may include heat treating the intermediate ORR catalyst for 30 minutes to 5 hours at a temperature of 1,000° C. to 2,000° C. The second deposition step may form an electrically interconnected catalyst network layer having a thickness of 1 to 20 atomic layers. The non-conductive particle substrate may be a yttria-stabilized zirconia (YSZ) particle substrate, and the first deposition step may include depositing the conductive catalyst material onto the YSZ particle substrate.

The first deposition step may include depositing platinum or a platinum-alloy onto the non-conductive particle substrate. The method may further include a metal deposition step including depositing a metal onto the non-conductive particle substrate, the intermediate ORR catalyst, or the electrically interconnected catalyst network layer.

In at least one embodiment, a proton exchange membrane fuel cell (PEMFC) cathode catalyst is provided. The cathode catalyst may include a non-conductive yttria-stabilized zirconia (YSZ) particle substrate and an electrically interconnected catalyst network layer including a platinum group element overlying the YSZ particle substrate and having a thickness of 0.5 to 20 nm. The electrically interconnected catalyst network may include pure platinum or a platinum alloy and has a specific activity of at least 1.5 mA/cm$^2$ Pt.

BRIEF DESCRIPTION OF THE DRAWINGS

FIG. 1 is a schematic view of an oxygen reduction reaction (ORR) catalyst on a non-conductive substrate, according to an embodiment;

FIGS. 2A and 2B are embodiments of methods of forming an ORR catalyst on a non-conductive substrate;

DETAILED DESCRIPTION

Figure 3:
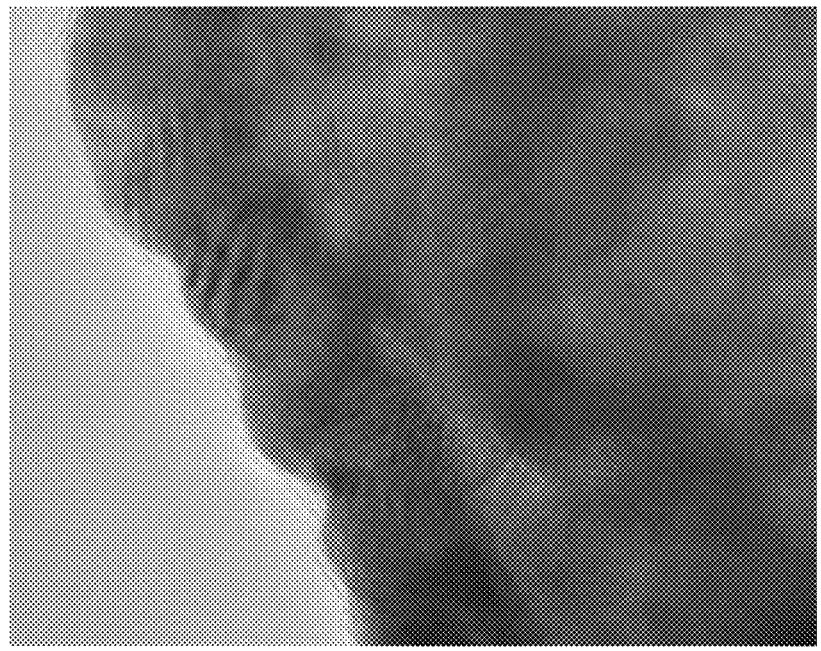
FIGS. 3-4 are transmission electron microscopy (TEM) images of a platinum catalyst deposited on yttria-stabilized zirconia (YSZ) powder.

Reference will now be made in detail to the embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation; and, unless expressly stated to the contrary, measurement of a property is determined by the same technique as previously or later referenced for the same property.

It is also to be understood that this invention is not limited to the specific embodiments and methods described below, as specific components and/or conditions may vary. Furthermore, the terminology used herein is used only for the purpose of describing one or more embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

A need exists for improved ORR catalyst designs, and methods of making such catalysts. Certain fuel cell and energy storage devices may lack efficient and stable catalysts. Embodiments of the present invention provide ORR catalysts on a non-conductive substrate that offer high catalytic activity while maintaining exceptional durability and long-term stability. The activity and durability properties of the disclosed ORR catalysts may be based on, at least in part, he preparation methods used and/or the resulting structure of the ORR catalysts.

Carbon powders that are used in conventional ORR catalysts are known to degrade through multiple pathways. For example, platinum may catalyze the formation of the solid carbon substrate into carbon dioxide at certain potentials. To avoid this degradation and provide increased durability and stability, ORR catalysts having non-conductive substrates are disclosed. The catalyst material may include platinum, gold, platinum group metals, or other noble metals, which may be in the form of pure metals and/or alloys (e.g., Pt—Au alloys). Platinum group metals may include group 8, 9, and 10 elements, such as ruthenium, rhodium, palladium, osmium, iridium, and platinum.

For catalyst materials that include platinum group alloys, the catalyst material may include at least 75 wt % of the platinum group element (e.g., Pt and/or Ir), with the balance being gold and/or other elements. The platinum group content may be even higher, for example, at least 80, 85, 90, or 95 wt %. In one embodiment, a platinum-gold catalyst material may have a composition of 90 wt % Pt and 10 wt % Au. The catalyst material loading may be up to about 25 wt % of the ORR catalyst as a whole (i.e., catalyst material and substrate), for example, 1 to 20 wt %, 2 to 15 wt %, 3 to 10 wt %, or about 5 wt %.

The non-conductive substrate may be in the form of powder or particles. In at least one embodiment, the powder may have a diameter of 10 to 100 nm, or any sub-range therein. For example, powder may have a diameter of 20 to 80 nm or 30 to 60 nm. The non-conductive substrate may include a ceramic material. In one embodiment, the non-conductive substrate includes yttria-stabilized zirconia (YSZ) and/or cerium oxide ($CeO_2$). YSZ is zirconium dioxide ($ZrO_2$) that is further stabilized by the addition of yttrium oxide ($Y_2O_3$). YSZ and other ceramic or non-conducting substrates may provide increased durability because they do not degrade, decompose, or otherwise breakdown under the same conditions as carbon substrates (or do so to a lesser degree). YSZ may be a suitable substrate because it is non-toxic and readily available. In addition, it can be mixed in a vacuum without mechanical mixing, such as by piezoelectric agitation.

In order for the ORR catalyst to be conductive without a conductive substrate, the catalyst must form a conductive layer on the surface of the substrate. Therefore, the catalyst material cannot be in the form of isolated particles that are disconnected from one another. Accordingly, with reference to FIG. 1, ORR catalysts 10 having a non-conductive substrate 12 and a two-dimensional (2-D), electrically interconnected catalyst material network layer 14 are disclosed. As used herein, a "2-D" layer is one in which the thickness dimension is much smaller than the in-plane dimensions of the structure, such as in a sheet of paper. The layer has a thickness, but the thickness in the z-direction (perpendicular to the surface plane of the substrate) is much smaller than the dimensions of the x and y directions (parallel to the surface plane of the substrate). The catalyst layer may be thicker (i.e., "3-D"), however, thicker layers may use more catalyst material, thereby increasing costs and catalyst mass without significant additional catalytic activity.

The connectedness of the layer 14 provides the catalyst 10 with electrical conductivity and the "2-D" aspect of the layer 14 increases surface area for enhanced catalytic activity and reduces the necessary catalyst material loading, thereby reducing costs. The electrically interconnected network structure may also be described as percolated or as a mesh, web, netting, or other open, but connected, structure. The term "percolated" may be described as an extended non-solid complex-network structure, similar to the structure of FIG. 1. In at least one embodiment, the catalyst layer 14 has openings or gaps 16 formed therein, such that the catalyst layer 14 is not a single, solid continuous sheet of material.

The catalyst layer 14 may have any suitable thickness. In one embodiment, the catalyst layer 14 may have a thickness of 1 to 20 atomic layers, or any sub-range therein, for example, 1-10, 1-5, or 1-2 atomic layers. In some embodiments, the catalyst layer 14 may therefore have a thickness of 0.5 to 20 nm, or any sub-range therein. For example, the thickness may be from 1 to 15 nm, 1 to 12 nm, 1 to 10 nm, or 1 to 5 nm. The specific activity of the disclosed catalysts may be higher than the specific activity of a typical Pt catalyst supported on carbon, which is up to about 1 $mA/cm^2$. The disclosed electrically interconnected network catalyst layer 14 may have a specific activity of at least 1.5 $mA/cm^2$ Pt. In one embodiment, the catalyst layer may 14 have a specific activity of at least 2.0 $mA/cm^2$ Pt. In another embodiment, the catalyst layer may 14 have a specific activity of at least 2.3 $mA/cm^2$ Pt.

The electrically interconnected network structure of catalyst layer 14 may form an electrically conductive layer regardless of the substrate (e.g., conductive or non-conductive substrate). The thin electrically interconnected network structure also provides the ORR catalyst 10 with a high specific activity that may approach, achieve, or surpass the bulk activity of platinum (~2.0 $mA/cm^2$ Pt). Therefore, the electrically interconnected network structure of catalyst layer 14 by itself may provide benefits over conventional ORR catalysts, regardless of the substrate. In addition, the electrical conductivity of the electrically interconnected network structure of catalyst layer 14 allows for the use of a non-conductive substrate that is not as prone to catalysis, degradation under cyclic loading, or other durability issues known to affect conductive substrates (e.g., carbon-based substrates). The combination of the electrically interconnected network structure of catalyst layer 14 and the non-conductive substrate may therefore provide an ORR catalyst that has high specific activity, low catalyst material loading, and increased durability.

With reference to FIGS. 2A and 2B, methods 20 and 21 of preparing an electrically interconnected network catalyst layer 14 are provided. The method 20 may include a first deposition process 22, a heat treatment 24, and a second deposition process 26. In one embodiment, the first and/or second deposition processes 22, 26 may include physical vapor deposition (PVD). In addition to PVD, other processes may be suitable for use in the first and/or second deposition steps, such as electrochemical deposition. However, wet chemical methods are not suitable for growing the disclosed "2-D" connected layer.

The first deposition process 22 may include loading the substrate powder 12 (e.g., YSZ powder) into a dispersion system within a vacuum chamber of a deposition device. In at least one embodiment, the vacuum chamber must have a base pressure of no more than $1 \times 10^{-6}$ torr. In one embodiment, the vacuum chamber may have a base pressure of about $5 \times 10^{-7}$ torr. The powder may then be dispersed, for example, using ultrasonic vibration, mechanical barrel rotation, or other dispersion methods. The deposition of the catalyst material (e.g., Pt, Pt-alloy, Pt—Au alloy) on the dispersed powder may be performed using any suitable deposition method, such as magnetron or dc sputtering. If the catalyst material is pure platinum, then a pure platinum target may be used. If the catalyst material is an alloy, such as a platinum alloy, then a target having the desired layer composition may be used. Alternatively, any other method for producing an alloy composition may be used, for example, a system having multiple targets (e.g., a pure platinum target and a pure gold target, for a Pt-Au alloy). The first deposition process 22 may be done in a reducing environment, which may include hydrogen gas. After the first deposition process 22, the catalyst may be considered an intermediate or transition catalyst, since the method is not yet complete.

Following the first deposition process 22, the intermediate catalyst is heat treated in step 24. In at least one embodiment, the temperature of the heat treatment 24 from 1,000° C. to 2,000° C. In another embodiment, the temperature of the heat treatment 24 is from 1,100° C. to 1,800° C., or any sub-range therein. For example, the temperature may be from 1,100° C. to 1,500° C. or 1,100° C. to 1,300° C. The heat treatment 24 may be performed for about 30 minutes to about 5 hours, or any sub-range therein. For example, the heat treatment 24 may last from 1 to 4 hours, 2 to 4 hours, or about 3 hours. In one embodiment, the heat treatment 24 may be performed in an air environment, however, other environments may also be used (e.g., inert). The heat treatment 24 may cause a transition in the catalyst layer 14 to a certain crystal orientation. For example, for Pt-based catalysts, a nearly complete transition to (111) oriented single crystals may occur. In addition, bridge-like connections between the crystals may be created, initiating the formation of the "2-D" electrically interconnected network structure. Accordingly, the heat treatment 24 serves to orient the Pt into a (111) flatter surface morphology.

Following the heat treatment, a second deposition process 26 is performed in which the catalyst material is deposited onto the intermediate catalyst and substrate. The second deposition process 26 may be performed using the same, or a similar process and under similar conditions as the first deposition process (e.g., PVD in a reducing environment). However, in one embodiment, the second deposition process 26 may performed in an inert environment, rather than a reducing environment. For example, the second deposition process 26 may be performed in argon or other noble gases, such as neon. The catalyst material in the second deposition process 26 may be the same as the first deposition process 22 (e.g., pure Pt or a Pt-alloy). In one embodiment, the catalyst material may be different from the first deposition process 22. For example, if the first deposition process 22 deposits pure Pt, the second deposition process 26 may deposit a Pt-alloy (or vice versa). During the second deposition process 26, the bridge-like connecting structures formed during the heat treatment 24 are enlarged and the "2-D" electrically interconnecting network structure is formed and expanded (e.g., the intermediate catalyst is converted into a catalyst layer having the electrically interconnecting network structure).

With reference to FIG. 2B, method 21 is disclosed, which includes the steps of method 20 but further includes an additional metal deposition step 28 and an optional additional heat treatment 30. Method 21 may be used to deposit an alloying element or composition (e.g., Au) in a separate step from the deposition of the catalyst material, such as pure platinum. Separating out the step of depositing the alloying material may allow the method to be performed on a wider range of equipment and/or may allow for changes in the deposition technique, conditions, or timing. The metal deposition step (MDP) 28 may be performed using the same, or similar processes and under similar conditions as the first or second deposition processes 22 or 26. For example, the MDP 28 may be performed using PVD, such as magnetron or dc sputtering. The MDP 28 may be performed in an inert environment or a reducing environment. The MDP 28 may be followed by an optional additional heat treatment 30. Heat treatment 30 may be similar to the heat treatment 24 (e.g., 1,100° C. to 1,800° C. for 0.5 to 5 hours), however, the time and temperature may be altered based on the metal being deposited. The optional heat treatment 30 may be performed to alter the morphology of the metal and/or to alter the electronic or other properties of the catalyst.

While the MDP 28 and the optional heat treatment 30 are shown in FIG. 2B as taking place after the heat treatment 24, they may be staged in the process 21 at any point. For example, they could be performed before or after the first deposition process 22, before or after the heat treatment 24 (as shown), or before or after the second deposition process 26. The heat treatment 30 may be optional and may not be necessary. For example, if the MDP 28 is performed prior to the heat treatment 24, a second heat treatment may not be required.

In at least one embodiment, the initial deposition step in either method 20 or 21 may be performed in a reducing environment. For method 20, the initial deposition step is the first deposition process 22, while for method 21, the initial deposition step may be the first deposition process 22 or the MDP 28. Without being held to any particular theory, it is believed that performing the initial deposition process in a reducing environment reduces the non-conductive substrate (e.g., YSZ) and provides for better adhesion of the initial deposition material (e.g., Pt, Au, or others). While a reducing environment may not provide substantial additional benefits to the deposition of subsequent layers (e.g., second deposition process 26), a reducing environment may also be used in subsequent deposition steps. Maintaining a reducing environment may allow later depositions steps to be done without needing to change the deposition environment, which may reduce the overall deposition time for the catalyst and/or simplify the overall deposition process. For example, if a deposition system is capable of performing depositions from two or more target materials without interruption, it may be beneficial to use a reducing environment throughout the deposition steps 22, 26, and optionally 28 in order to reduce total deposition time by avoiding stopping and starting and/or manually switching out PVD targets. If the deposition equipment requires replacement of the targets or if there are other reasons to stop and start the depositions, then the environment may be changed to an inert environment for any or all depositions after the initial deposition.

Figure 4:
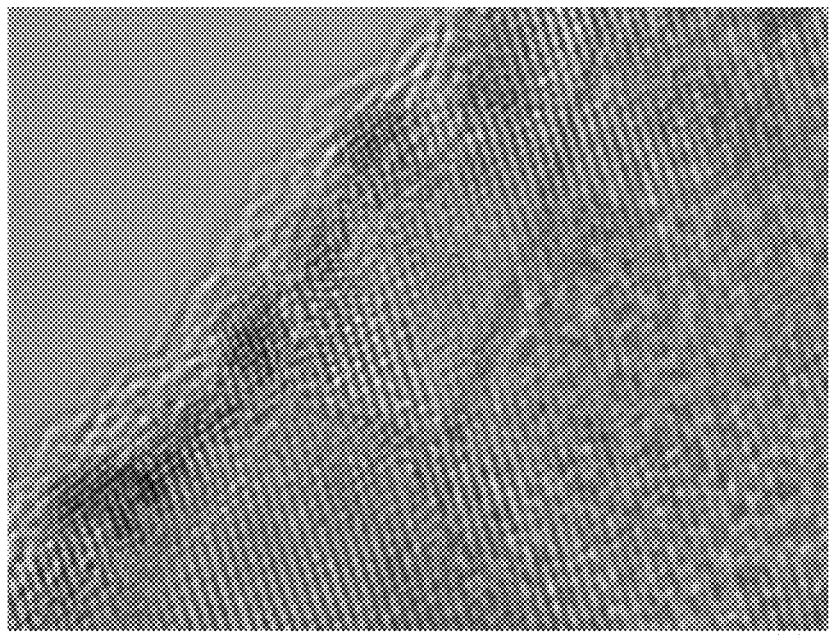

With reference to FIGS. 3 and 4, transmission electron microscopy (TEM) images of pure platinum deposited on YSZ powder according to the disclosed methods are shown. The images show that the Pt forms crystalline, "2-D" clusters having an electrically interconnected network morphology. FIG. 3 is a TEM image taken at 500,000× magnification and shows the electrically interconnected Pt network structure (dark areas) on the YSZ powder (lighter areas). FIG. 4 is a TEM image taken at 1,000,000× magnification and shows that the Pt is formed as connected atomic rows, not as discrete particles. The ORR catalyst shown in FIGS. 3 and 4 was found to have a specific activity of 2.33 mA/cm$^2$ Pt.

Figure 5:
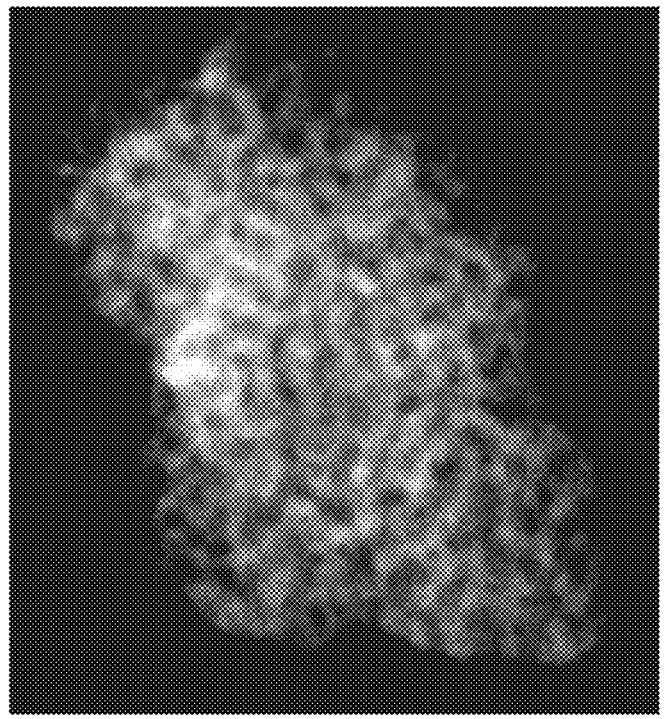
FIG. 5 is a scanning transmission electron microscopy (STEM) image of a platinum-gold alloy catalyst material deposited on YSZ powder.
Figure 6:
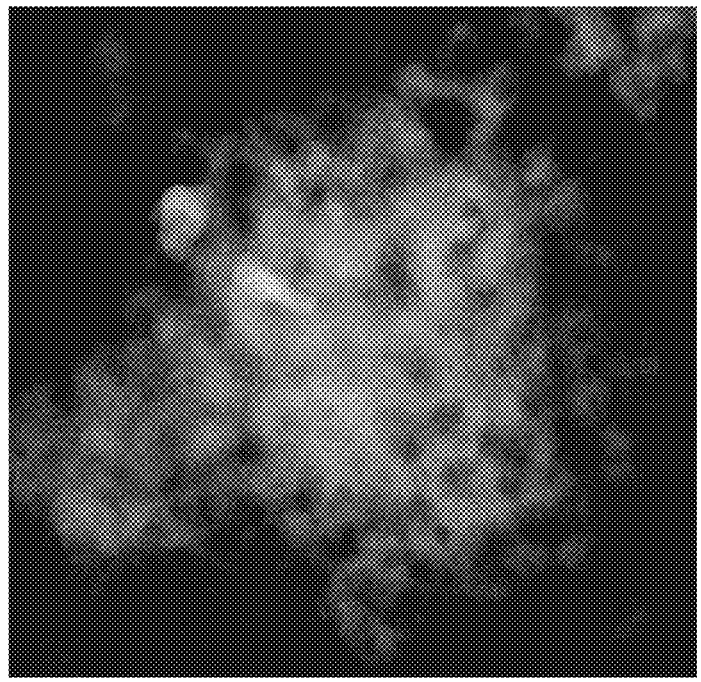
FIG. 6 is a STEM image of a gold catalyst deposited on YSZ powder.

With reference to FIGS. 5 and 6, scanning transmission electron microscopy (STEM) images of a platinum-gold alloy and gold, respectively, deposited on YSZ powder according to the disclosed methods are shown. The images show that the catalyst material (Pt—Au or Au) forms an electrically interconnected network structure (light areas) on the YSZ powder substrate (dark areas). The composition of the Pt—Au catalyst material in FIG. 5 is approximately 90 wt % Pt and 10 wt % Au. The material in FIG. 6 is pure gold.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming an oxygen reduction reaction (ORR) catalyst comprising:
   a first deposition step including depositing a first conductive catalyst material onto a non-conductive particle substrate to form an intermediate ORR catalyst;
   a heat treatment step including heat treating the intermediate ORR catalyst; and
   a second deposition step including depositing a second conductive catalyst material onto the heat-treated intermediate ORR catalyst to form an electrically interconnected catalyst network layer overlying the non-conductive particle substrate.

2. The method of claim 1, wherein the first deposition step is performed in a reducing environment.

3. The method of claim 1, wherein the heat treating step includes heat treating the intermediate ORR catalyst for 30 minutes to 5 hours at a temperature of 1,000° C. to 2,000° C.

4. The method of claim 1, wherein the second deposition step is performed in an inert environment.

5. The method of claim 1, wherein the second deposition step forms an electrically interconnected catalyst network layer having a thickness of 1 to 20 atomic layers.

6. The method of claim 1, wherein the first and second deposition steps include sputtering.

7. The method of claim 1, wherein the non-conductive particle substrate is a yttria-stabilized zirconia (YSZ) particle substrate, and the first deposition step includes depositing the first conductive catalyst material onto the YSZ particle substrate.

8. The method of claim 1, wherein the first and second deposition steps include depositing platinum or a platinum-alloy onto the non-conductive particle substrate.

9. The method of claim 1 further comprising a metal deposition step including depositing a metal onto the non-conductive particle substrate, the intermediate ORR catalyst, or the electrically interconnected catalyst network layer.

10. The method of claim 9, wherein the metal deposition step includes depositing a metal onto the intermediate ORR catalyst after the heat treatment step; and
    a second heat treatment step including heat treating the metal is performed after the metal deposition step.

11. The method of claim 1, wherein the heat treating step includes heat treating the intermediate ORR catalyst for 2 to 4 hours at a temperature of 1,100° C. to 1,500° C.

12. The method of claim 1, wherein the first conductive catalyst material and the second conductive catalyst material are the same material.

13. The method of claim 1, wherein the first conductive catalyst material and the second conductive catalyst material are different materials.

14. The method of claim 1, wherein the heat treatment step causes the intermediate ORR catalyst to transition to a (111) crystal orientation.

* * * * *